(12) United States Patent
Dettmer et al.

(10) Patent No.: US 9,320,194 B2
(45) Date of Patent: Apr. 26, 2016

(54) SCREEN CHAIN CONVEYOR FOR ROOT CROP HARVESTING MACHINES

(71) Applicant: Grimme Landmaschinenfabrik GmbH & Co. KG, Damme (DE)

(72) Inventors: Franz-Josef Dettmer, Ankum (DE); Andre Hagelüken, Speyer (DE)

(73) Assignee: Grimme Landmaschinenfabrik GmbH & Co. KG, Damme (DE)

( * ) Notice: Subject to any disclaimer, the term of this patent is extended or adjusted under 35 U.S.C. 154(b) by 0 days.

(21) Appl. No.: 14/454,840

(22) Filed: Aug. 8, 2014

(65) Prior Publication Data

US 2015/0076040 A1  Mar. 19, 2015

(30) Foreign Application Priority Data

Aug. 10, 2013 (DE) .......... 10 2013 013 446

(51) Int. Cl.
*B65G 17/00* (2006.01)
*A01D 17/10* (2006.01)
*B07B 1/10* (2006.01)
*B07B 1/12* (2006.01)

(52) U.S. Cl.
CPC . *A01D 17/10* (2013.01); *B07B 1/10* (2013.01); *B07B 1/12* (2013.01); *B65G 17/00* (2013.01); *A01D 2017/103* (2013.01)

(58) Field of Classification Search
CPC .......... B65G 15/50; B65G 15/36; F16G 3/02; F16G 3/04; F16G 3/09
USPC ..... 198/844.2, 848, 849; 24/33 P, 33 R, 31 H
See application file for complete search history.

(56) References Cited

U.S. PATENT DOCUMENTS

| 4,815,587 | A | * | 3/1989 | Musil | B65G 15/52 198/844.2 |
| 5,099,548 | A | * | 3/1992 | Loosli | B65G 15/52 198/844.2 |
| 5,701,638 | A | * | 12/1997 | Schick | F16G 3/04 198/844.2 |
| 6,053,308 | A | * | 4/2000 | Vogrig | F16G 3/02 198/844.2 |

FOREIGN PATENT DOCUMENTS

| DE | 1 756 050 U1 | 11/1957 |
| DE | 1 084 984 | 7/1960 |
| DE | 31 25 310 A1 | 1/1983 |
| DE | 34 06 333 A1 | 8/1985 |
| DE | 34 07 167 A1 | 8/1985 |
| DE | 34 29 004 A1 | 2/1986 |
| DE | 270 648 A1 | 8/1989 |
| DE | 272 212 A1 | 10/1989 |
| DE | 39 03 921 A1 | 8/1990 |
| DE | 32 46 530 A1 | 7/1991 |
| DE | 297 16 333 U1 | 1/1998 |
| DE | 270 649 A1 | 8/1998 |
| EP | 0 312 629 A1 | 4/1989 |

* cited by examiner

*Primary Examiner* — James R Bidwell
(74) *Attorney, Agent, or Firm* — Gudrun E. Huckett (57) ABSTRACT

A screen chain conveyor for a root crop harvesting machine has a support belt having belt ends and transverse conveying rods secured in the support belt. A belt fastener is provided that has connecting members attached to the belt ends, respectively. The belt fastener has an articulated connection connecting the connecting members. The articulated connection has a component pair and a seal adapted to prevent at least penetration of dirt particles into the component pair.

27 Claims, 10 Drawing Sheets

SCREEN CHAIN CONVEYOR FOR ROOT CROP HARVESTING MACHINES

BACKGROUND OF THE INVENTION

The invention relates to a screen chain conveyor in the form of a screening rod conveyor for root crop harvesting machines that is provided with a belt fastener in the area of at least one of the support belts that receive respective transverse conveying rods, wherein the belt fastener comprises at least one hinge-like articulated connection in the area of connecting members engaging the respective belt ends.

According to DE 1 756 050 U1, a screen conveyor is proposed whose screening rods that are arranged as transverse conveying rods are secured laterally in the area of a belt which is acting as a support belt. The belt ends that are comprised of reinforced belt material are detachably connected to each other by means of a hinge joint wherein a screening rod is acting as a hinge bolt, respectively (similar arrangement: DE 32 46 530 C2). In case of a belt fastener according to DE 1 084 984 A, respective connecting members are also provided in the area of the belt ends. They form the belt fastener by means of a torsionally flexible intermediate member that is fixedly connected to both connecting members. The screw connections provided in this context are not very load-resistant so that the belt fastener in use of the conveyor is subjected to great wear.

According to DE 31 25 310 A1, a screen chain conveyor is proposed in which the belt fastener is provided with an approximately H-shaped intermediate coupling member and the connecting members provided with transverse bores can be connected also by means of the chain rods provided for the system. In a screen chain conveyor according to EP 0 312 629 B1, the belt fastener is designed as a separate hinge whose connecting plates provided with the link eyes engage underneath a free end of the belt, respectively, and secure the belt ends by interacting with a pressure member that is arranged on the topside of the belt. In this way, a comparatively tall belt fastener is provided that is exposed to intensive wear and thus reduces the service life of the conveyor.

In an endless connection for screen rod conveyors according to DE 34 06 333 A1, tabs are provided in the area of the belt ends. They delimit laterally a common connecting element wherein screening rods extend through the latter and the tabs, respectively. A similar construction is disclosed in DE 34 07 167 A1 wherein the respective tabs are provided with widened portions so that improved contact points are defined for the moving conveyor. The construction according to DE 34 29 004 C2 is also provided with an intermediate member that has tabs wherein an additional one of the transverse rods is secured on a connecting bridge in the area of the intermediate member.

In a chain fastener connection that is disclosed in DD 270 648 A1, a separate insertion member is provided in the area of the belt fastener and comprises inwardly projecting parts projecting toward the transverse rods and, in this way, engages the transverse conveying rods. Similar constructions are disclosed in D 270 649 A1 and in DD 272 212 A1 wherein variable embodiments of stud bolts and screw connections are provided, respectively.

In a screening rod according to DE 39 03 921 A1, the belt ends in the area of the connecting members are engaged by respective U-shaped fixtures of metal by means of rivet-like fastening elements. At the free end of the fixtures, meshing webs are formed that serve for receiving a locking bolt. A similar construction is disclosed in DE 297 16 333 U1 wherein this belt fastener in the area of the connecting members has, oppositely positioned relative to each other, a center eye and two lateral eyes which are pivotably connected to each other by a transverse bolt. Accordingly, the connecting members that interact in pairs have conforming connecting profiles meshing with each other and, in the area of the connecting profiles, a respective transverse conveying rod is connected with the connecting members.

In practical use of the afore described prior art belt fasteners on screen chain conveyors for root crop harvesting machines, it has been found that soiling of the components occurring during harvesting operation, in particular in the area of the fastener pairing of the belt fastener, leads to increased wear and the service life of such screen chain conveyors is disadvantageously reduced.

The invention has therefore the object to design a screen chain conveyor for root crop harvesting machines in such a way that at least in the area of the belt fastener that engages the belt ends a reduced wear occurs so that the service life of the system can be extended and, by a simpler repair, a faster return of defective component groups or modules to operation is possible.

SUMMARY OF THE INVENTION

In accordance with the present invention, this is achieved in that the screen chain conveyor for root crop harvesting machines in accordance with the present invention has an articulated connection that is embodied as a component pair which is provided with at least one seal sealing at least relative to penetration of dirt particles. Further embodiments of the screen chain conveyor are disclosed in the dependent claims.

A screen chain conveyor for root crop harvesting machines is provided with a belt fastener in the area of its at least one support belt which receives the respective transverse conveying rods. The belt fastener has in the area of the connecting members that engage the respective belt ends at least one hinge-like articulated connection. Based on this basic configuration, the concept according to the invention provides that the at least one articulated connection is a component pair that is embodied so as to be sealable at least relative to penetration of dirt particles. For this purpose, the articulated connection is embodied as a component pair provided with at least one seal to prevent penetration of dirt.

With this efficient protection by a novel seal in the area of the "sensitive" load area of the screen chain conveyor it is achieved that, even when using different sealing arrangement, an effective protection is provided for the component pairs that are interacting under frictional loading in the area of the belt fastener. In this way, the finely divided soil components, dust particles, rocks, gravel, and similar abrasive contaminant particles that are encountered in a harvesting operation, for example, when harvesting beets or potatoes, cannot pass into the area between rotatory and/or translatory moving components of the component pair. Accordingly, in particular a grinding-caused wear with wear of system components is substantially prevented or at least delayed for a long period of time so that the service life of the system is prolonged and repair intervals can be extended.

It is understood that, depending on the construction principle of the screen chain conveyor or the belt fastener which can be variably embodied with regard to the connecting members in the area of the belt ends, several of the articulated connections can be designed also as sealable component pairs. Also, it is provided that in the area of the respective articulated connection(s) or the component pair(s) several sealable areas can be integrated into the system.

It is also conceivable that the construction principle according to the invention with a sealable component connection on a screen chain conveyor can be further improved and directed at providing the articulated connection to be fluid-tight. In this way, additionally the undesirable penetration of liquid, in particular water, can be avoided so that generation of rust is inhibited.

With further technical optimizations it is also conceivable to define the component pairs provided in the area of the articulated connection by gliding surfaces that are resting immediately in gliding contact on each other and thereby form a sealing action. These gliding surfaces can be formed with appropriate support profiles of the meshing components.

An optimal configuration of the screen chain conveyor with regard to service life and wear provides that the at least one articulated connection in the area of the respective component pair of the belt fastener is provided with at least two sealing elements that effect the sealing action and are spaced apart in the area of the component pair.

Based on the different possibilities of the constructive realization of this "hinge connection", it is apparent that the component pairs provided in the area of the connecting members each can be in the form of a rod-sleeve structure or a rod-bushing structure. In the area of this plug structures, the respective sealing elements are then integrated into the "pivot system" in such a way that upon contact and relative movement of base member and counter member no dirt particles can penetrate into the inner zone of the hinge or pivot that is closed off (sealed) in accordance with the invention.

The concept of the articulated connections is aimed at providing their components with respective "transverse conveying rods" that are designed as special connecting rods. These connecting rods in their length contour and terminal contour can be designed, in deviation to known transverse conveying rods that are provided, for example, with a rivet connection to the support belt, as continuous cylinder-shaped rods so that in particular the plug connection of the connecting components at the connecting members can be realized in a simple way and a fast installation as well as exchange of components is possible.

Based on this basic concept, it is provided that two sealing elements each that are interacting in pairs are spaced apart across the width of the belt ends or the plug connection and in this way these two sealing elements seal the end areas of at least one respective connecting rod.

This articulated embodiment of the belt fastener provides in a further embodiment that the connecting rods that are extending in the area of the correlated belt ends are each forming a transverse axis for one of the sealable articulated connections and, between these two articulated connections, a connector is provided that engages in an articulated fashion the two connecting rods, respectively.

In this context, it is provided that the connecting rods interacting with the sealing elements in the sleeve-like or bushing-like area at the respective connecting member are securable with at least one locking pin that is acting as an anti-rotation device.

An optimal construction for mounting and demounting of the belt fastener is achieved in that the connector that is provided in the area of the belt fastener is itself embodied of at least two separable intermediate members. These two intermediate members of the connector are provided with support contours that at least partially positively (with form fit) engage each other. In this way, by a simple "plug connection"—in the longitudinal or transverse direction of the screen chain conveyor—mounting and demounting can be done quicky and the two parts of the connector are then pre-assembled fixedly and with form fit.

The final assembly in the area of this belt fastener can be realized in that in the area of the two intermediate members a transverse bolt is provided that engages both intermediate members in their form-fit "plug position". By means of a cotter pin securing device provided at one of the ends of the transverse bolt, the two hinge-like complementary parts of the intermediate member can be secured. With a comparatively simple removal of the transverse bolt, the belt fastener at this position can thus be opened, if needed, so that a repair-friendly construction is achieved.

This concept of the connector with two intermediate members leads to the hinge-like construction that is known in general. The two parts of the intermediate member that are connected in a novel way are provided in the area of the transverse bolt with a tongue-and-groove connection as the form-fit profiling, wherein the tongue-and-groove connection is extending parallel to the adjacent connecting rods. It can be produced with minimal expenditure and can be matched to different sizes of connectors in a simple way. It is understood that in the area of these intermediate members of the connector several sealing elements are provided that prevent penetration of soil particles or similar environmental contaminant parts.

In a further embodiment, it is conceivable that in place of the afore described two-part connector a single-part (monolithic) shaped profile member is provided. It can interact immediately with the connecting members of the support belt and, in doing so, can define in the area of the connecting rods two articulated connections which are to be provided with the seal according to the invention.

The effective constructive realization of the sealable component pairs provides that the paired sealing elements integrated into the respective articulated connection are designed in the form of contact seals that are generally known. These sealing elements can also be embodied of a multi-part configuration.

In addition to a positive-locking (form fit) fixation of the sealing elements, it is also provided that the sealing elements are secured in the sealing position by means of a radial and/or tangential pressing action.

For the form fit fixation of the sealing elements it is provided that in the area of the connector and/or in the area of the connecting rods received in the connector, a respective shaped recess for receiving the sealing elements is formed.

Also, it is conceivable that several of the sealing elements are combined to a seal component group. An optimal configuration provides that an O-ring seal and a labyrinth seal are interacting in the area of the component pair.

DESCRIPTION OF PREFERRED EMBODIMENTS

Figure 17:
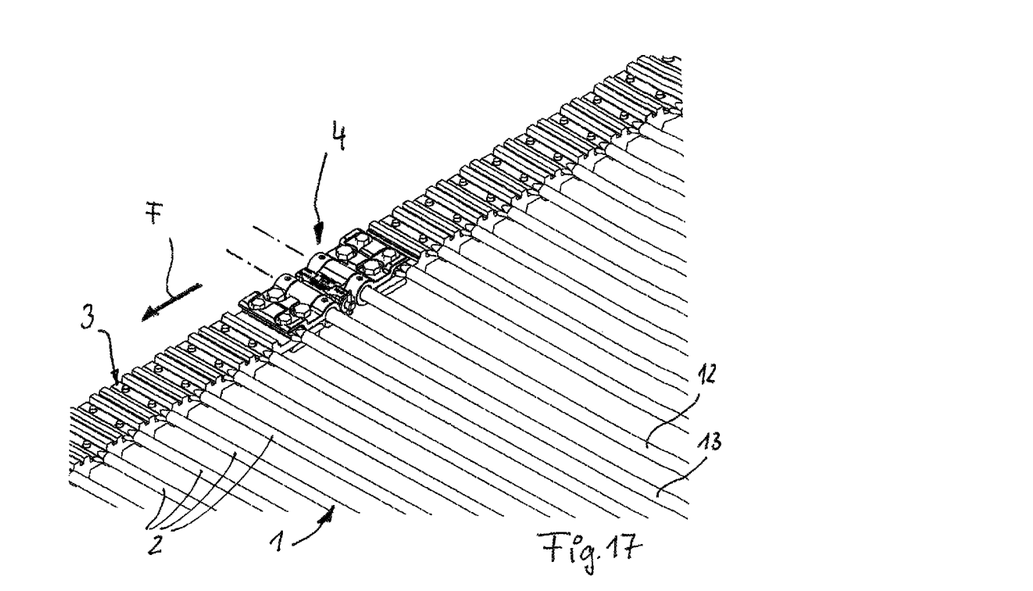
FIG. 17 is a perspective detail illustration of the screen chain conveyor for root crop harvesting machines with the belt fastener according to FIG. 1 in accordance with the invention.
Figure 18:
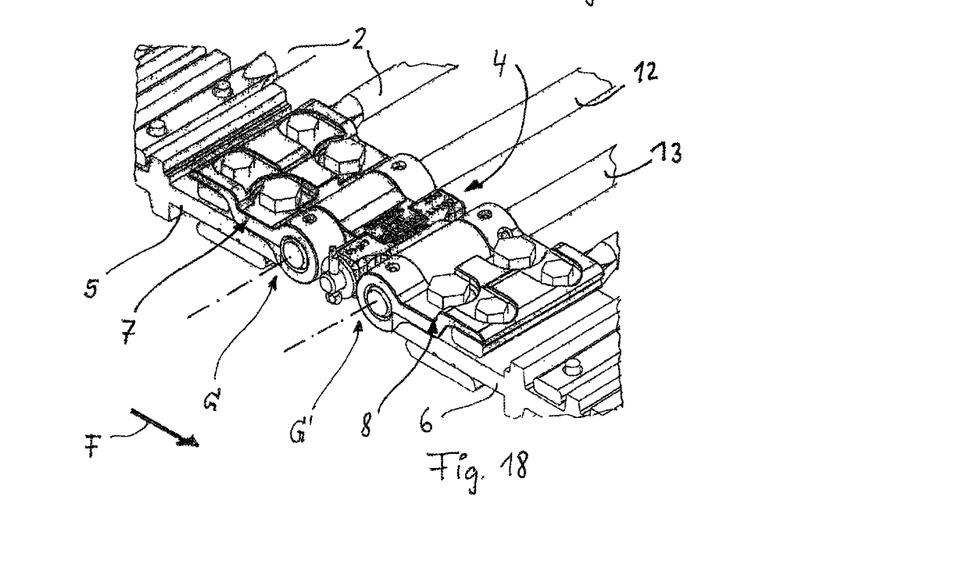
FIG. 18 is a detail illustration in the area of the belt fastener according to FIG. 17.

FIG. 17 and FIG. 18 show a detail view of a screen chain conveyor 1 for a root crop harvesting machine (not shown). Such agricultural screen chain conveyors 1 are provided with a belt fastener 4 in the area of a support belt 3 that receives the respective transverse conveying rods 2. Such belt fasteners 4 have in the area of the connecting members 7, 8 that are engaging the respective belt ends 5, 6 at least one hinge-like articulated connection G (indicated by a dash-dotted line). In the illustrated embodiment of the belt fastener 4 according to FIG. 18, it is apparent that the belt fastener 4 is provided with two of these articulated connections G, G'.

The concept according to the invention provides that the at least one articulated connection G, G', G" of the belt fastener 4 is to be provided with a component pair that can be sealed at least with respect to penetration of dirt particles (not illustrated), respectively. The constructive realization provides that the component pairs which are formed by the respective articulated connections G, G', G" are provided with at least one seal A, A' (FIG. 5), respectively.

The respective illustrations of this optimized belt fastener 4 according to FIG. 1 through FIG. 4 show that the screen chain conveyor 1 provided therewith is moved together with the components of the belt fastener 4 in a conveying direction F. In this situation of use, with reference to the longitudinal center plane M, movement paths B and B' are followed, respectively. Accordingly, the component pairs in the area of the articulated connection G, G', G" experience corresponding rotatory (B) and/or translatory (B') movement components. In the respective gap areas S (FIG. 5) between the component groups of the articulated connections G, G', G", environmental dirt can be introduced so that in particular by increased friction a corresponding abrasive wear on the "moving" parts occurs and this wear, up to now, leads to repairs being needed after a comparatively short service life.

This wear process, which is particularly intensive under harvesting conditions on sandy soils, can now be limited by sealing in accordance with the invention the articulated connections G, G', G". In view of the variably constructed component combinations in the area of the belt fastener 4 it is apparent that the conveyor 1 in the area of the belt ends 5, 6 can be provided also with several sealable articulated connections G, G', G" and the appropriate sealing systems and, in this way, a "wear-free" belt fastener 4 is defined.

Figure 1:
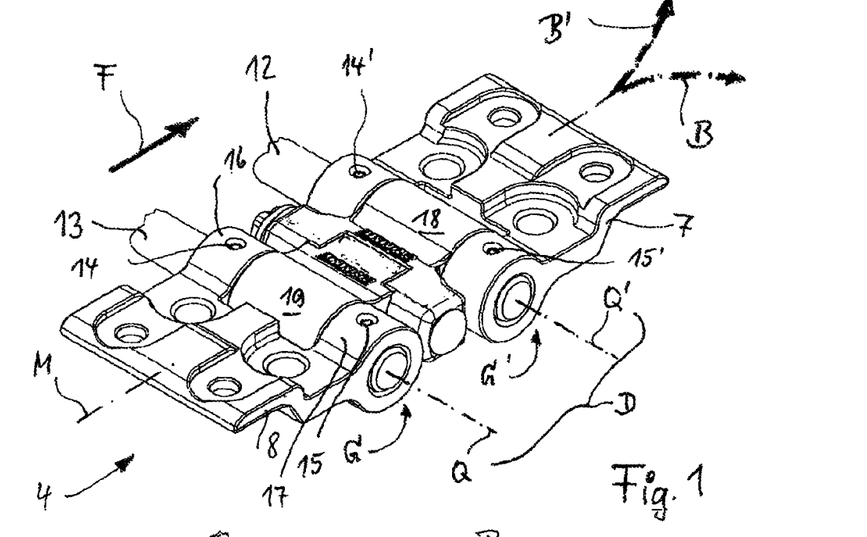
FIG. 1 is a perspective illustration of a first embodiment of the belt fastener according to the invention in the area of two connecting members.
Figure 2:
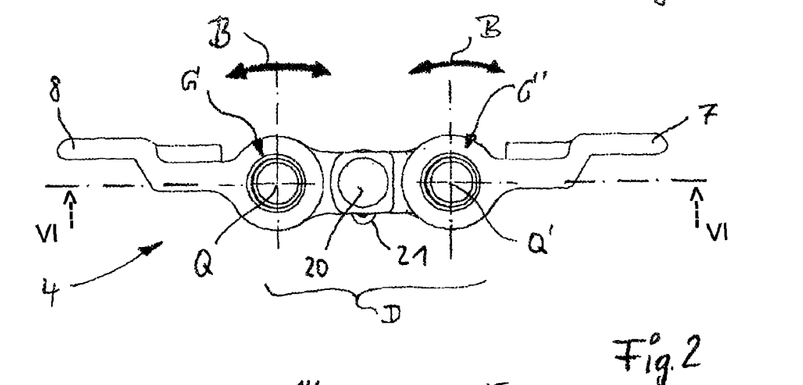
FIG. 2 is a front view of the belt fastener according to FIG. 1.
Figure 3:
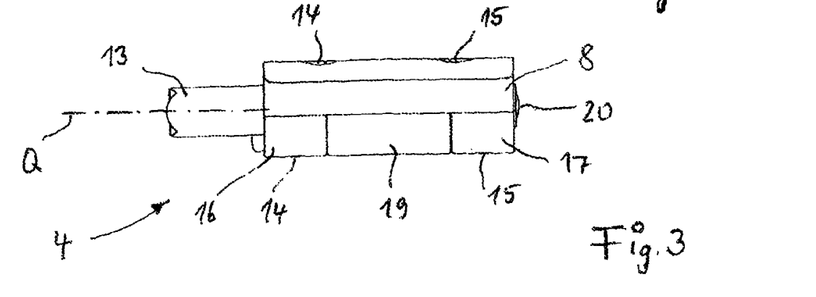
FIG. 3 is a side view of the belt fastener according to FIG. 1.
Figure 4:
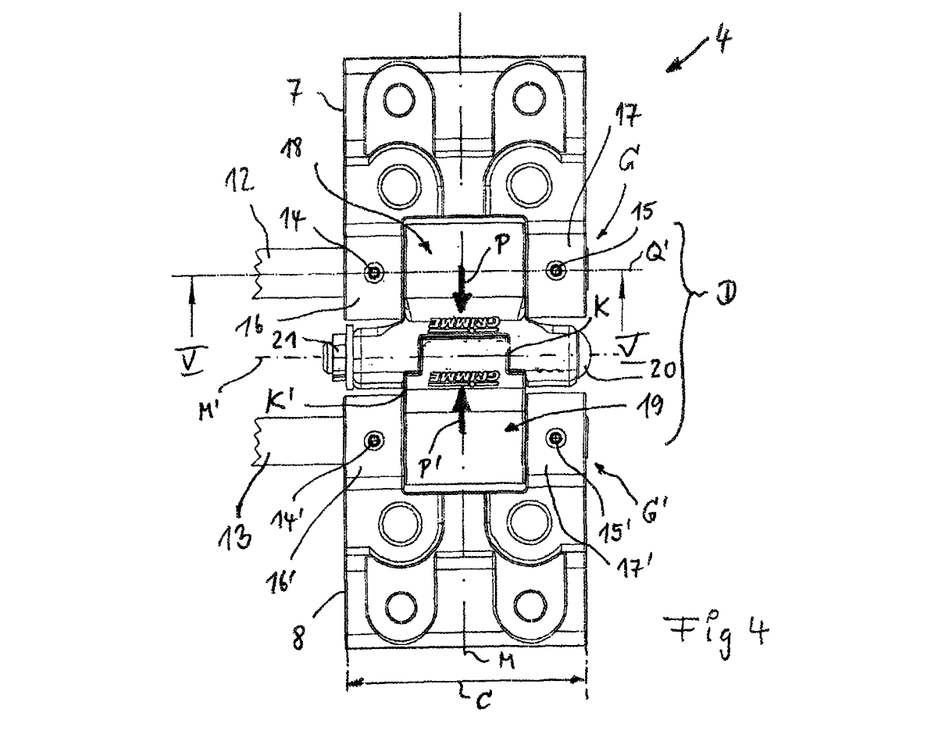
FIG. 4 is a plan view of the belt fastener according to FIG. 1.
Figure 5:
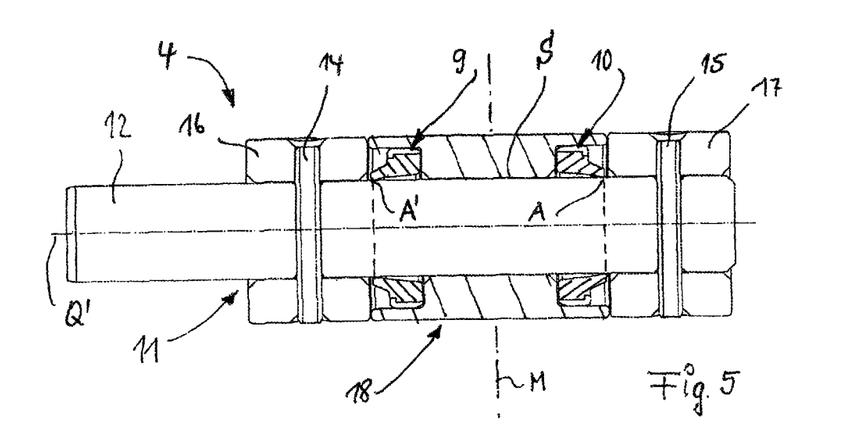
FIG. 5 is a section illustration according to line V-V of FIG. 4.

In FIG. 5, the articulated connection G of the belt fastener 4 is illustrated in a section illustration according to section line V-V of FIG. 4. In this context, the preferred embodiment of this component pair is apparent which is provided with two sealing elements 9, 10 effecting a sealing action (seal A, A'). For illustrating the protective action, which prevents penetration of particles (and/or liquid) at least into the inner gap area S, the respective seals are illustrated as a dashed line A, A'.

It is thus apparent that in the area of the respective articulated connection G, G', G" or the component pair of the belt fastener 4 several sealable areas are provided. A further technical configuration of these areas that are sealable at A, A' is conceivable in that the articulated connections G, G', G" can also be provided with a fluid-tight sealing action (not illustrated).

Also, it is conceivable that in the area of the articulated connections G, G', G" the component pairs are configured with an immediately gliding seal and, in this context, gliding surfaces that at least over sections thereof contact each other (similar to the seals A, A' of FIG. 5) interact in such a way that penetration of dirt particles is prevented.

When looking at the embodiment according to FIG. 1 through FIG. 5, it is apparent that the component pairs provided in the area of the connecting members 7 and 8 for forming the belt fastener 4 each can be embodied as a rod-sleeve structure or a rod-bushing structure. A configuration has been found advantageous in which the articulated connections G, G', G" are provided with respective "transverse conveying rods" as connecting rods 12, 13. The section illustration according to FIG. 5 makes it clear that in this context a rod-sleeve structure 11 is formed.

This structure that is "open" at both ends has the constructive consequence that two sealing elements 9, 10 interacting as a pair are spaced apart across the width C (FIG. 4) of the connecting members 7, 8 or of the belt fastener 4. In the illustrated embodiment, it is provided that the two sealing elements 9 and 10 are arranged in the respective central area of the articulated connection G, G', G" still to be described (FIG. 5).

The embodiment of the belt fastener 4 illustrated in FIG. 1 through FIG. 12 is characterized in that the connecting rods 12, 13 extending in the area of the correlated connecting members 7, 8 each form a transverse axis Q, Q' for one of the sealable articulated connections G, G', G". In this context, between these two articulated connections G, G', G", a connector D is provided engaging the respective connecting rod 12 or 13 in an articulated fashion.

This construction provides that the connecting rods 12, 13 interacting with the sealing elements 8, 9 in sleeve-shaped areas are securable by means of a locking pin 14, 15 or 14', 15' acting as an anti-rotation device at the respective connecting members 7, 8. In the illustrated sleeve-shaped embodiment of this connecting area, the connecting members 7, 8 are provided with spaced-apart projections 16 and 17 as well as 16' and 17' wherein a part 18, 19 of the connector D, positioned between these two projections 16, 17; 16' 17' that are interacting in pairs, engages in an articulated fashion the respective connecting rod 12, 13. In this way, a generally known "hinge-like" articulated connection is defined wherein the connector D at least partially is pivotable about the two connecting rods 12, 13 (arrow B, FIG. 2).

When looking at FIG. 4 and the respective section illustrations according to FIG. 6 through FIG. 12, it is apparent that the connector D is formed of at least two separable intermediate members 18, 19. They comprise the afore described configuration of the respective articulated connection G, G', G" with the anti-rotation devices 14, 15; 14', 15' relative to the respective connecting rod 12, 13.

The concept of this two-part connector D provides that the two intermediate members 18 and 19 at least partially engage each other by a form-fit connection. This form-fit engagement (contour K, K') is designed such that by a plug connection (arrow P, P', FIG. 4) the two intermediate parts 18 and 19 engage each other fixedly (non-rotatably). In this way, also a "hinge-like" engagement (FIG. 6) is achieved wherein this engagement is secured by a transverse bolt 20 with cotter pin securing device 21. In this way, the force transmission in the longitudinal direction of the system (conveying direction F, FIG. 1) is possible.

Based on the section illustrations of the drawing, it is apparent that the two intermediate members 18, 19 of the connector D in the area of the transverse bolt 20 have a tongue-and-groove contour K, K' that is extending parallel to the adjacent connecting rods 12, 13. In the area of the intermediate members 18, 19, the sealing elements 9, 10 as well as 9', 10' are arranged oppositely positioned in pairs (FIG. 6 to FIG. 12) and prevent penetration of soil particles or similar environmental parts.

With this construction a "closed system" is integrated such into the belt fastener 4 that it can be mounted and demounted optimally. Even under dirt-intensive conditions on a harvesting area, the stiff bolt-cotter pin connection 20, 21 can be released easily. At the same time, the protected articulated connections G, G', G" are neither damaged nor stressed by penetrating dirt. Therefore, repair and/or exchange phases at the screen chain conveyors 1 according to the invention can be carried out particularly easily.

Figure 14:
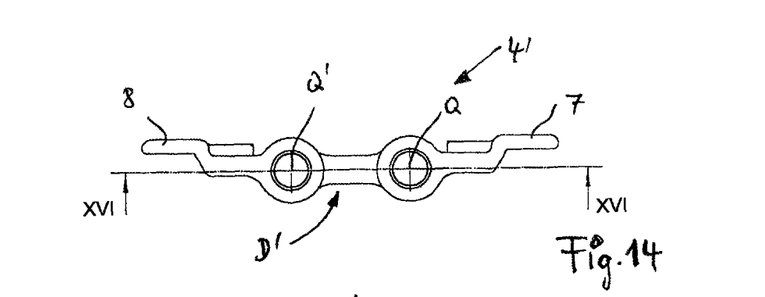
FIG. 14 is a front view of the belt fastener according to FIG. 13.
Figure 15:
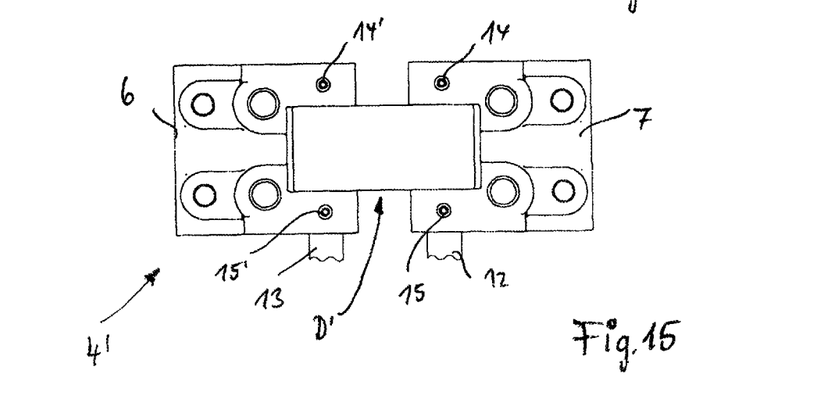
FIG. 15 is a plan view of the belt fastener according to FIG. 13.
Figure 16:
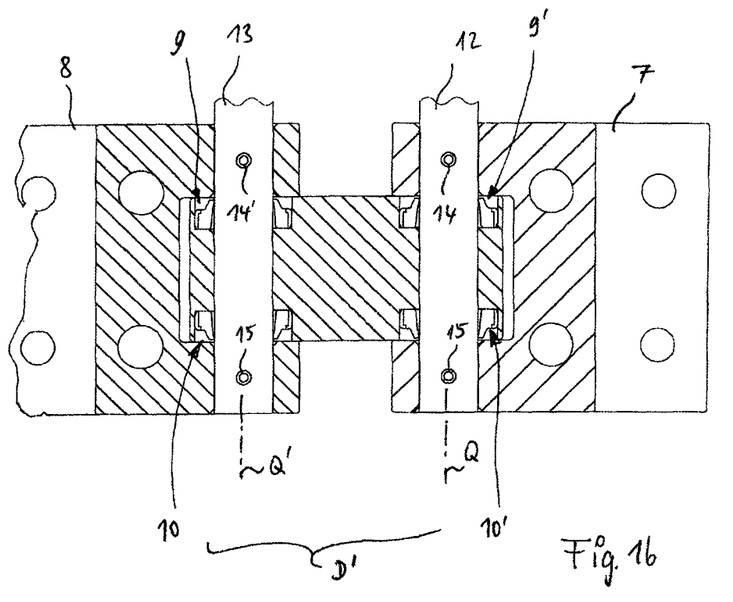
FIG. 16 is a section illustration according to line XVI-XVI of FIG. 14.

A second embodiment of the afore described sealing concept is provided with a connector D' (FIG. 13 to FIG. 16) wherein this connector is embodied as a single-part (monolithic) component. From the respective views according to FIG. 14 (end view), FIG. 15 (plan view), and FIG. 16 (section illustration in the area of the sealing elements 9, 10; 9', 10'), it is apparent that the already described components are functionally interacting herein in a similar configuration.

For all of the afore described embodiments of belt fasteners 4 or 4', it has been found to be advantageous that the sealing elements 9, 10 and 9', 10' integrated in pairs into the respective articulated connection G, G', G" are embodied in the form of generally known contact seals. They are arranged in accordance with the connector D mirror-symmetrical to the transverse center plane M', respectively, so that the corresponding individual parts of the seals A, A' are not individually described and are apparent from the illustrations.

Figure 6:
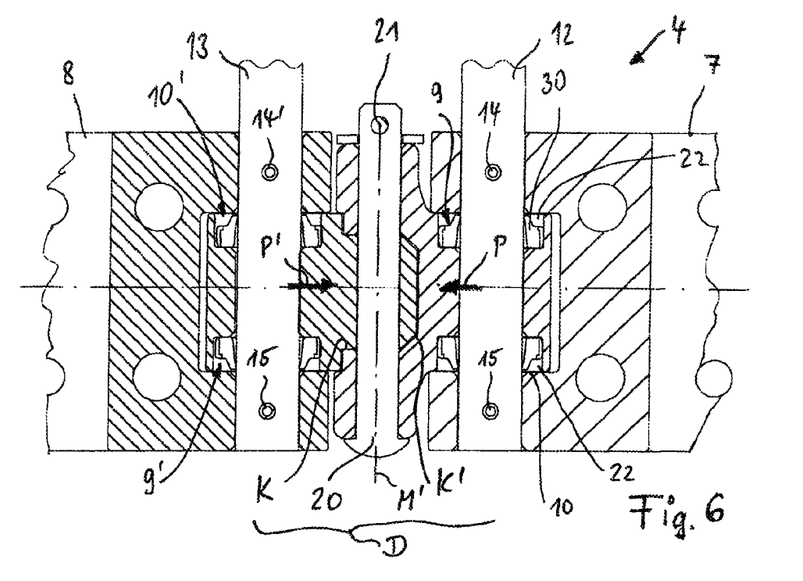
FIG. 6 is a section illustration according to line VI-VI of FIG. 2 of a first configuration of sealing elements in the area of two articulated connections at the belt fastener.
Figure 7:
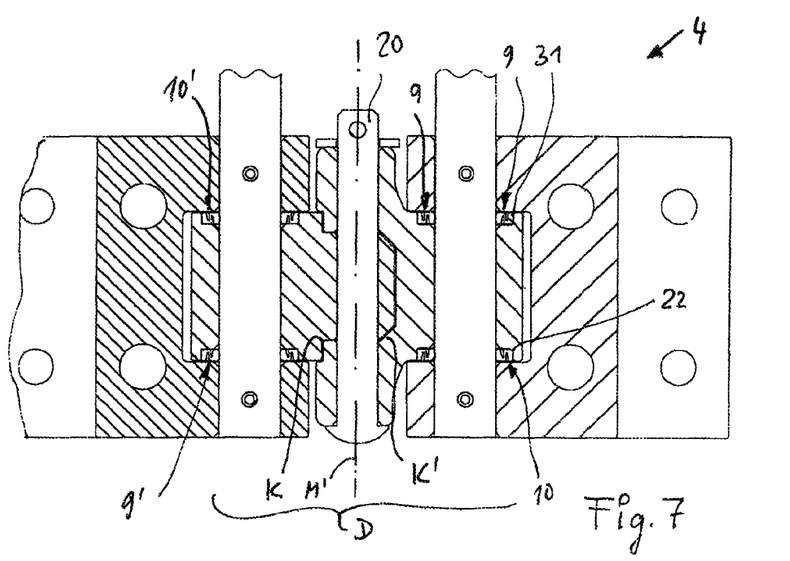
FIG. 7 is a section illustration in analogy to FIG. 6 of a second configuration of the sealing elements in the area of two articulated connections at the belt fastener.
Figure 8:
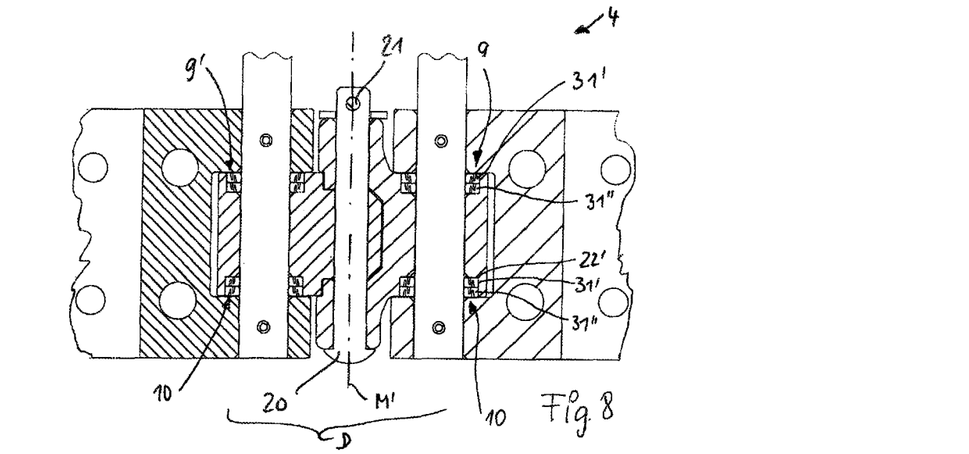
FIG. 8 is a section illustration in analogy to FIG. 6 of a third configuration of the sealing elements in the area of two articulated connections at the belt fastener.

In FIG. 6 a single-part configuration of the contact seal is illustrated wherein the contact seal is preferably in the form of a polyamide stripper 30 and, in this context, a corresponding pressing of the seals is carried out in the area of a respective fiber-reinforced outer ring. In the embodiment according to FIG. 7, a sealing element 31 is illustrated which is designed as a stripper of rubber material wherein herein a comparatively simply designed annular groove 22 is used. The radially pretensioned sealing ring 31 seals in this context between the connecting rod 12, 13 and the respective intermediate member 18, 19 of the belt fastener 4. The radial pretension of this stripper 31 makes it possible that wear occurring after an extended period of use can be compensated by the elastic action of the rubber seal. In FIG. 8, a similar configuration is illustrated wherein here two strippers 31', 31" are arranged in an annular groove 22' behind each other.

Figure 9:
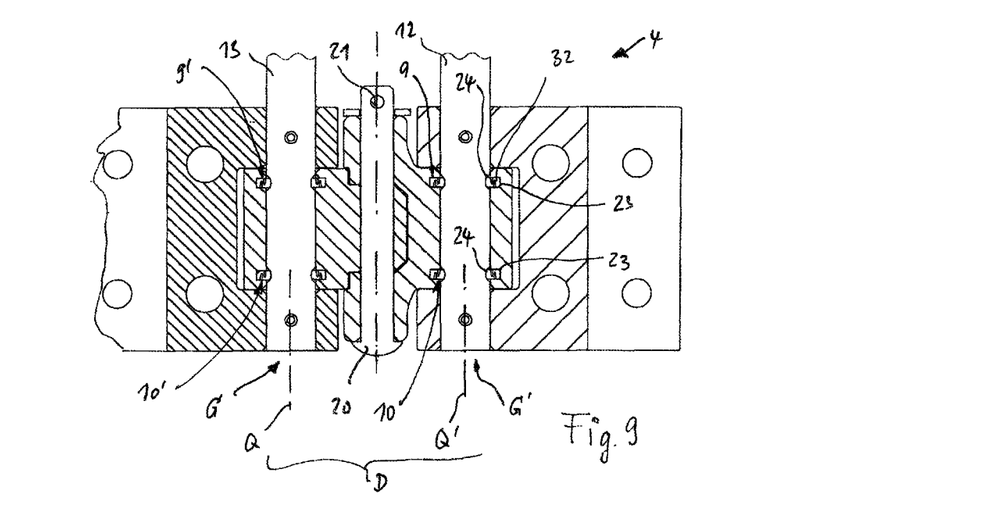
FIG. 9 is a section illustration in analogy to FIG. 6 of a fourth configuration of the sealing elements in the area of two articulated connections at the belt fastener.

In the construction according to FIG. 9, there is also a stripper 32 of rubber material provided; it engages complementary groove-shaped receiving openings 23 and 24 in the area of the intermediate member 18, 19 or the connecting rods 12, 13. Appropriate groove profiles are formed in the two interacting components for this purpose.

Figure 10:
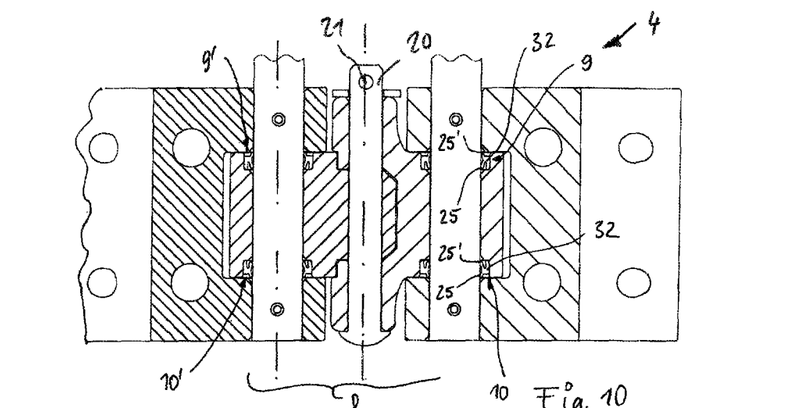
FIG. 10 is a section illustration in analogy to FIG. 6 of a fifth configuration of the sealing elements in the area of two articulated connections at the belt fastener.
Figure 11:
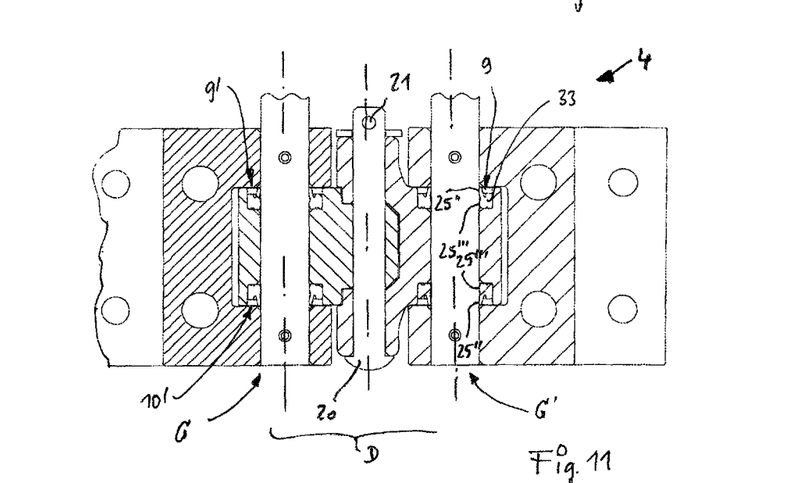
FIG. 11 is a section illustration in analogy to FIG. 6 of a sixth configuration of the sealing elements in the area of two articulated connections at the belt fastener.

In the embodiment illustrated in FIG. 10, a stripper 32 of polyurethane is used wherein the stripper 32 has a sealing lip 25, 25' that is acting on two sides and therefore provides a particularly efficient sealing action. A similar configuration is illustrated in FIG. 11 wherein here a solid configuration of a polyamide stripper 33 (similar to FIG. 6) with sealing lips 25" and 25''' is provided.

Figure 12:
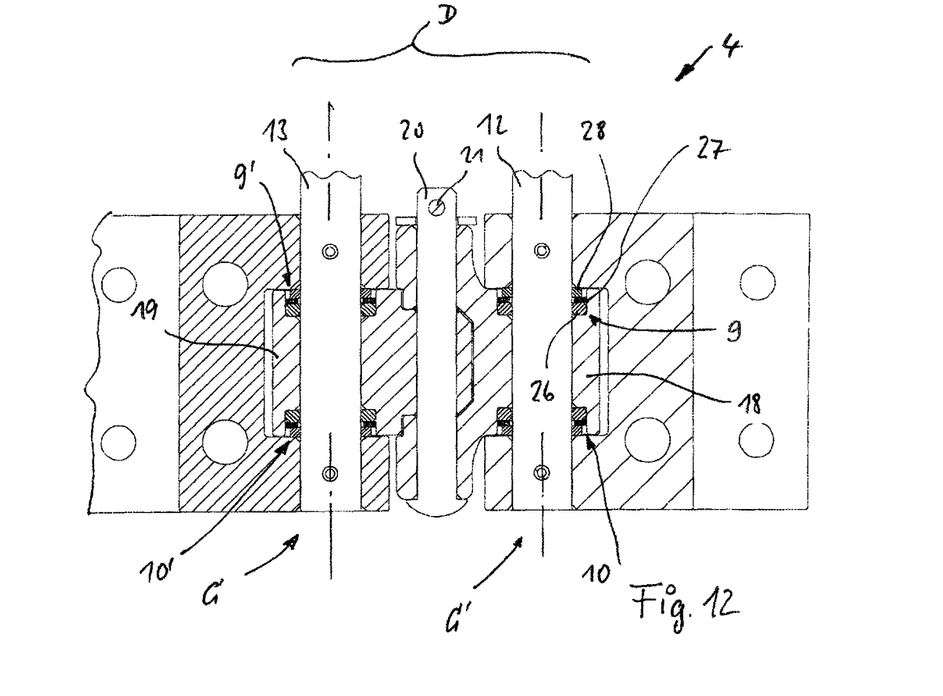
FIG. 12 is a section illustration in analogy to FIG. 6 of a seventh configuration of the sealing elements in the area of two articulated connections at the belt fastener.
Figure 13:
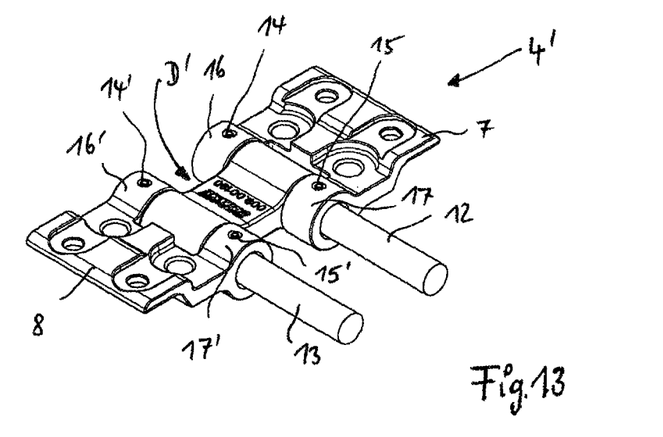
FIG. 13 is a perspective illustration similar to FIG. 1 of a second embodiment of the belt fastener with monolithic (single-part) connector.

A further conceivable embodiment with a multi-part sealing element 9, 10 or 9', 10' is illustrated in FIG. 12 wherein here in the area of the intermediate part 18 or 19 a clamping connection is illustrated which receives an O-ring 26, a washer 27, and an outer washer 28. The O-ring 26 is of such a size that by means of the two washers 27, 28 an appropriate pressure fixation is achieved.

In a further embodiment (FIG. 19 to FIG. 21) it is conceivable to integrate an appropriate labyrinth seal 34 into the system.

Figure 19:
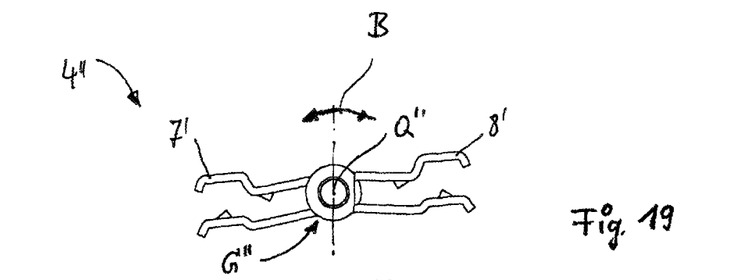
FIG. 19 is a third embodiment of the belt fastener with only one articulated connection.
Figure 20:
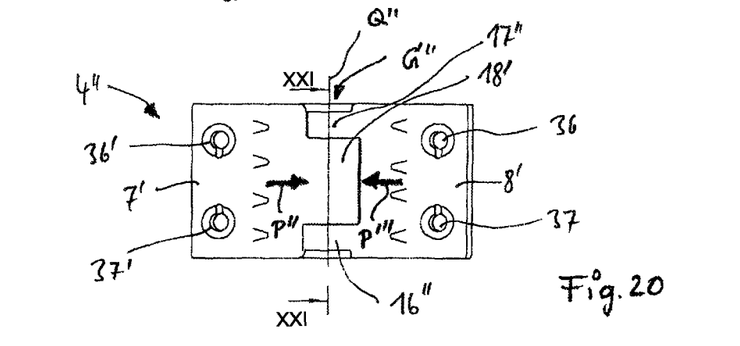
FIG. 20 is a plan view of the belt fastener according to FIG. 19.
Figure 21:
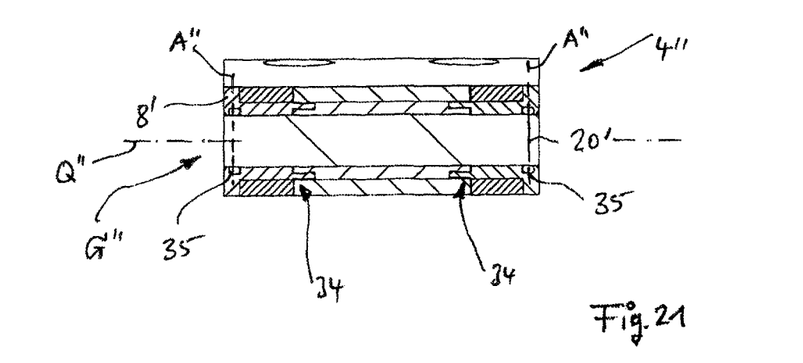
FIG. 21 is a section illustration of the articulated connection of FIG. 20 according to section line XXI-XXI.

This third embodiment of a sealed belt fastener 4" according to FIG. 19 to FIG. 21 is provided with a "direct" connecting construction in the area of the two connecting members 7', 8'. These connecting members 7', 8' are now shaped for forming the single articulated connection G''' (FIG. 20) with complementary sleeve projections 16", 17", and 18' forming plug connection parts. In the area of these sleeve projections 16", 17", and 18', the transverse connector 20' is used as a single connector to establish the articulated connection.

In this context, the connecting members 7', 8' are connected directly with the belt ends 5, 6 (not illustrated here; see FIG. 18) in the area of the slanted connecting openings 36, 37, 36', 37'.

FIG. 21 illustrates that the provided transverse connector 20' may comprise, in addition to the inner labyrinth seal 34, also an edge seal 35 as an "additional sealing device A".

The specification incorporates by reference the entire disclosure of German priority document 10 2013 013 446.3 having a filing date of Aug. 10, 2013.

While specific embodiments of the invention have been shown and described in detail to illustrate the inventive principles, it will be understood that the invention may be embodied otherwise without departing from such principles.

What is claimed is:

1. A screen chain conveyor for a root crop harvesting machine, the screen chain conveyor comprising:
a support belt having belt ends;
transverse conveying rods secured in the support belt;
a belt fastener comprising connecting members attached to the belt ends, respectively, and further comprising an articulated connection connecting the connecting members;
wherein the articulated connection comprises a component pair and a seal adapted to prevent at least penetration of dirt particles into the component pair;
wherein the component pair comprises gliding surfaces that at least over sections thereof are contacting each other and form said seal with an immediate gliding sealing action.

2. The screen chain conveyor according to claim 1, wherein the seal is effective for movements of the component pair including rotatory movement and translatory movement.

3. The screen chain conveyor according to claim 1, wherein the belt fastener comprises several of said articulated connection.

4. The screen chain conveyor according to claim 1, wherein the articulated connection comprises several of said seal.

5. The screen chain conveyor according to claim 1, wherein the articulated connection is fluid-tight.

6. The screen chain conveyor according to claim 1, wherein the component pair is a rod-sleeve structure or a rod-bushing structure.

7. The screen chain conveyor according to claim 1, wherein the component pair comprises a connecting rod and wherein the connecting rod is one of the transverse conveyor rods.

8. A screen chain conveyor for a root crop harvesting machine, the screen chain conveyor comprising:
a support belt having belt ends;
transverse conveying rods secured in the support belt;
a belt fastener comprising connecting members attached to the belt ends, respectively, and further comprising an articulated connection connecting the connecting members;
wherein the articulated connection comprises a component pair and a seal adapted to prevent at least penetration of dirt particles into the component pair;
wherein said seal comprises sealing elements that effect a sealing action;
wherein the component pair comprises a connecting rod and wherein the connecting rod is one of the transverse conveyor rods;
wherein the belt fastener comprises two of said articulated connections and wherein said connecting rods each form a transverse axis for said articulated connections, the belt fastener further comprising a connector connecting said two articulated connections by articulatedly engaging the connecting rods.

9. The screen chain conveyor according to claim 8, wherein the sealing elements are spaced apart across a width of the belt ends and the sealing elements seal end areas of the connecting rod.

10. The screen chain conveyor according to claim 8, wherein the connecting rods are secured on the connecting members by a locking pin, respectively, that is acting as an anti-rotation device, and wherein an intermediately positioned part of the connector is supported articulatedly on the connecting rods.

11. The screen chain conveyor according to claim 8, wherein the connector is comprised of at least two separable intermediate members and the two separable intermediate members each have associated therewith one of said articulated connections.

12. The screen chain conveyor according to claim 11, wherein the two separable intermediate members engage each other at least across sections thereof by a form-fit connection.

13. The screen chain conveyor according to claim 12, wherein the two separable intermediate members are connected to each other by a hinge connection.

14. The screen chain conveyor according to claim 12, wherein the connector further comprises a transverse bolt with a cotter pin securing device.

15. The screen chain conveyor according to claim 14, wherein the two separable intermediate members have adjacent to the transverse bolt a tongue-and-groove connection extending parallel to the connecting rods.

16. The screen chain conveyor according to claim 14, wherein the belt fastener is opened or closed by actuating the transverse bolt and the cotter pin securing device of the connector.

17. The screen chain conveyor according to claim 16, wherein the articulated connection remains intact when the belt fastener is opened and the component pair remains sealed.

18. The screen chain conveyor according to claim 11, wherein in the area of the separable intermediate members several of said sealing elements are provided to prevent penetration of soil particles or environmental contaminant parts.

19. The screen chain conveyor according to claim 8, wherein the connector is a monolithic shaped component.

20. The screen chain conveyor according to claim 8, wherein the sealing elements are integrated in pairs in the articulated connection and are embodied as contact seals.

21. The screen chain conveyor according to claim 8, wherein the sealing elements are of a multi-part configuration.

22. The screen chain conveyor according to claim 8, wherein the sealing elements are secured in a sealing position by at least one of a radial pressing action and a tangential pressing action.

23. The screen chain conveyor according to claim 8, wherein the connector or the connecting rods have shaped recesses for receiving the sealing elements.

24. The screen chain conveyor according to claim 8, wherein the connector and the connecting rods have shaped recesses for receiving the sealing elements.

25. The screen chain conveyor according to claim 8, wherein several of the sealing elements are combined to a sealing component group.

26. The screen chain conveyor according to claim 8, wherein the sealing elements comprise an O-ring seal and a labyrinth seal.

27. A screen chain conveyor for a root crop harvesting machine, the screen chain conveyor comprising:
a support belt having belt ends;
transverse conveying rods secured in the support belt;
a belt fastener comprising connecting members attached to the belt ends, respectively, and further comprising an articulated connection connecting the connecting members;
wherein the articulated connection comprises a component pair and a seal adapted to prevent at least penetration of dirt particles into the component pair;

wherein the connecting members have complementary plug connection parts forming a component of said component pair of said articulated connection, wherein said component pair further comprises a transverse connector extending through the plug connection parts.

* * * * *